Feb. 15, 1966     P. E. DOHERTY ET AL     3,235,630
METHOD OF MAKING AN OPTICAL TOOL
Filed July 17, 1962     4 Sheets-Sheet 1

Paul E. Doherty
Henry H. Blau, Jr.
Richard S. Davis
*INVENTORS*

BY
Attorney

SURFACE OF
ALUMINUM CRYSTAL
AFTER ELECTROPOLISHING

SURFACE OF
ALUMINUM CRYSTAL
AFTER FURTHER OXIDATION
OF ELECTROPOLISHED SURFACE

United States Patent Office

3,235,630
Patented Feb. 15, 1966

3,235,630
METHOD OF MAKING AN OPTICAL TOOL
Paul E. Doherty, Belmont, Mass., Henry H. Blau, Jr., Greenbrae, Calif., and Richard S. Davis, Lexington, Mass., assignors to Arthur D. Little, Inc., Cambridge, Mass., a corporation of Massachusetts
Filed July 17, 1962, Ser. No. 210,347
12 Claims. (Cl. 264—1)

This invention relates to an optical tool and more particularly to fine wire grid which can be used as a diffraction grating or as a polarizer.

Gratings, whether made by cutting a series of fine slits, by ruling, or by aligning a number of thin wires to form a screenlike grid, have long been known as optical tools both in experimental and industrial applications. Among their uses may be listed polarizers and diffraction gratings. Recently it has been proposed to form wire-grid polarizers by forming a replica of a ruled grating and subsequently shadowing the replica to form a series of fine metallic lines along the ridges in the replica. (See for example the Journal of the Optical Society of America, vol. 50, 886–891.) Although this technique eliminates the construction of a wire grid with fine wires (which are limited in the minimum diameters which are usable), it still requires the actual ruling of lines or grooves on a substrate to produce the original, or master, grating structure. This in itself is a major limitation, a limitation due to mechanical difficulties associated with the actual ruling of the lines. Ruled gratings having 28,000 lines to the linear inch (spaced 9,100 Angstroms apart) are commercially available and ruled gratings having 55,000 lines per inch (Spaced 4,600 Angstroms apart) have been reported (JOSA, 50, 886–891). Using the latter grating in the construction of a wire-grid polarizer it was possible to efficiently polarize light having a wavelength in the range of about 2–15$\mu$, that is, in the infrared. However, for some purposes it would be desirable to be able to polarize light in the visible or in the ultraviolet range, that is light of wavelengths longer than about 0.2$\mu$. It would also be highly desirable to have gratings which possess far greater dispersion and resolving power than heretofore attainable. Finally, it would be very desirable to have a grid system which could be used in calibrating other optical tools with greater accuracy than now possible.

It is therefore an object of these inventions to provide a method for constructing a grating which has finer lines spaced much closer than previously possible. It is another object of this invention to provide a method of the character described which does not require the actual ruling of the lines by mechanical means. It is another object to provide gratings of the character described which are reliably reproducible and reasonably simple to produce. It is another object of this invention to provide gratings and polarizers which are controllable with respect to the thickness of lines and performance characteristics of the grating when used in any application. It is another primary object of this invention to provide a grating having lines spaced about 350 Angstroms apart. It is another object to provide a grating of the character described which is capable of being used in the making of polarizers for the infrared, visible and ultra-violet wavelength regions. It is still another object to provide a grating which may be used in a wide variety of embodiments and for a wide variety of applications both experimental and industrial. Other objects of the invention will in part be obvious and will in part be apparent hereinafter.

The invention accordingly comprises the several steps and the relationship of one or more such steps with respect to each of the others, which will be exemplified in the method hereinafter disclosed, and the scope of the invention will be indicated in the claims.

For a fuller understanding of the nature and objects of the invention reference should be had to the following detailed description taken in connection with the accompanying drawings in which.

The method of preparing the grating or grid of this invention having extremely close fine lines comprises the steps of electropolishing the surface of a single aluminum crystal thereby to form periodic corrugations made up of recurring valleys and peaks on the surface (the surface being defined as any plane resulting from rotating a {110} plane about the crystal axis in a <110> direction up to about 36 degrees and in a <100> direction up to about 15 degrees); casting a thin film replica of the corrugated surface; and shadowing the peaks of the corrugated surface to form a gridwork of very fine lines extremely close together. It may be desirable to further oxidize the corrugated surface formed after electropolishing to increase the difference between the height of the peaks and the valleys and accentuate the corrugations prior to forming the replica.

In the following description of this invention the Miller indices will be employed to describe planes and rotations, and they will be used in their conventional manner. Thus the designation {110} includes all possible planes in the crystal having these indices as related to the x, y and z axes, respectively. Likewise, rotation in a <100> direction includes all combinations possible, i.e., [001] [010] [100] [00$\bar{1}$] [0$\bar{1}$0] and [$\bar{1}$00].

Figure 2:
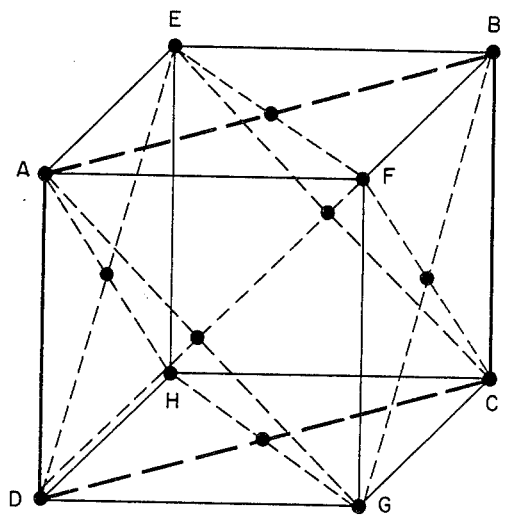
FIG. 2 is an aluminum crystal showing a {110} plane used in forming the grid of this invention.

The aluminum crystal is known to be face-centered cubic, as illustrated in FIG. 2, and the surface of the crystal used in the practice of this invention is a {110} plane rotated within the limits described below. In FIG. 2 a conventional face-centered cubic is illustrated. Using Miller indices, it will be seen that the {110} planes are those defined by the rectangles ABCD, EFGH, EBDG, AECG, BFDH and AFCH. A {110} plane may be rotated within certain limits and in certain directions and still be usable in this invention. When rotated about the <110> direction the angle of rotation may be up to 36° on either side of the normal plane position while when it is rotated about the <100> direction the angle of rotation may be up to 15° on either side of the normal plane position.

The single crystal of aluminum which is required is grown according to known practice, and more particularly according to the technique of Bridgman as modified by Chalmers. A description of this method by which single crystals are grown from a hot melt is described in The Proceedings of the Royal Society A 196, 64 (1949). The single aluminum crystal should preferably be of very high purity, e.g. of the order of 99.992%. However, some impurities may be present and purities of as low as 99.95% aluminum may be used. Typically, a single crystal grown to expose a {110} plane may be about one-quarter inch wide, one-half inch thick and about eight inches long. However, the size is not critical.

The surface of {110} plane is then electropolished in a suitable solution made up of a mixture of an acid and a lower aliphatic alcohol. For example a solution comprising one part of perchloric acid and five parts of anhydrous methyl alcohol has been found to be particularly satisfactory in the electropolishing of the crystal for this invention. In like manner electropolishing solutions may be made up using glacial acetic acid and ethyl or methyl alcohol. Electropolishing is carried out by the well established anodic treatment of the aluminum in the solution. The aluminum crystal is made the anode, stainless steel (typically) is used as a cathode, and a D.C. current density of about 5 amperes/in.$^2$ is used. Electropolishing is carried out for from about two to twenty minutes. The temperature of the electropolishing solution may range from about −40 to +20° C. It will be appreciated that current density, time and temperature may be varied over wide ranges.

Subsequent to removal of the crystal from the electropolishing solution it is washed to remove all of the solution used in this step. This is normally done by washing in circulating cold water for about an hour or more.

Figure 3:
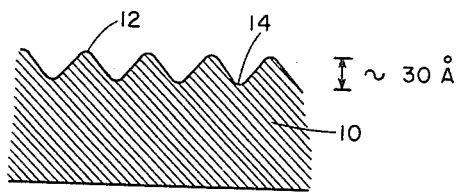
FIG. 3 is a cross-section of an aluminum crystal after electropolishing showing typical dimensions involved.

In the electropolishing of a {110} plane of the single aluminum crystal very fine corrugations are formed on the surface, being made up of periodically occurring peaks and valleys. A very much enlarged cross-sectional view of a portion of such a surface is shown in FIG. 3. It will be appreciated that no attempt has been made in FIGS. 3–10 to draw these cross-sections to scale. FIG. 3 illustrates the surface of the aluminum crystal after electropolishing. The crystal 10 has a corrugated surface formed of peaks 12 and valleys 14. Typically, the difference in height between a peak and a valley is of the order of about 30 Angstroms.

Figure 1:
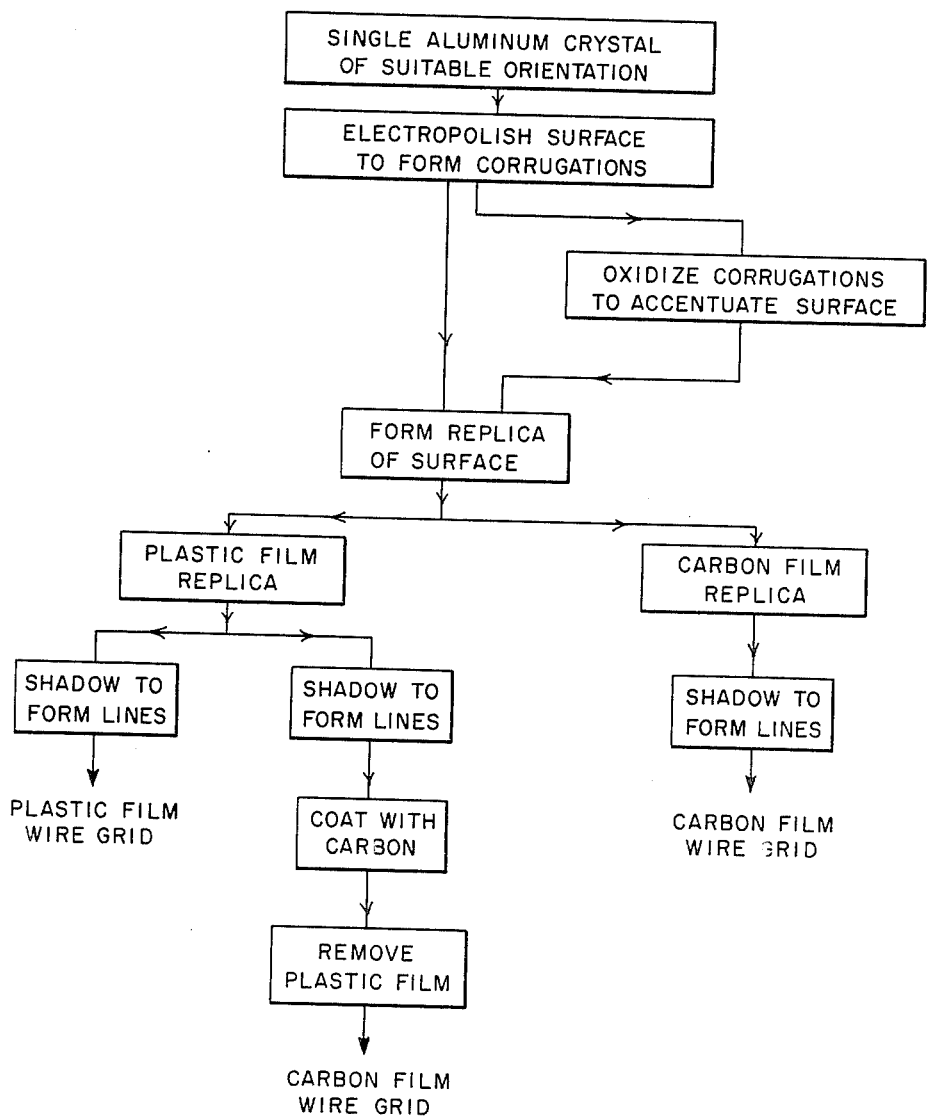
FIG. 1 is a flow diagram of the process of this invention showing several modifications.
Figure 4:
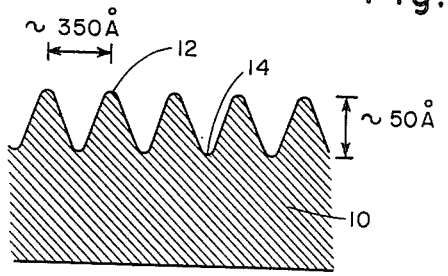
FIG. 4 is a cross-section of the aluminum crystal of FIG. 3 after further oxidation showing typical dimensions.

As will be seen in the flow diagram of the process given in FIG. 1, the electropolished surface may be used directly in the formation of a replica, or the electropolished surface may be oxidized further to build up or accentuate the corrugated surface on the crystal. This further oxidation of the surface may be accomplished by one of two ways, heating or anodizing. The net result of this oxidizing step is to build up a surface such as shown in FIG. 4 wherein the difference in height of the peaks 12 and valleys 14 is materially increased. Typically, this difference which measures the height of the corrugations is about 50 Angstroms after oxidation.

If further oxidizing is to be accomplished through heating this is done by any suitable technique in an oxidizing atmosphere, preferably air. Heating may be accomplished up to about 550° C., or somewhat below the actual melting point of aluminum. The actual amount of oxidizing accomplished in this step, and hence the degree of accentuation of the corrugations, is of course a function of both temperature and time. Both of these conditions may be regulated to achieve the final desired degree of oxidation or corrugation on the surface.

The second technique by which this further oxidation may be accomplished is that of anodizing. This is preferably done in an aqueous solution of 1% citric acid and 1% ammonium citrate at room temperature using a suitable voltage. Typically, voltages from 3–5 volts may be used, and anodization is carried out until the desired degree of oxidation or corrugation build-up has been obtained. Other anodizing solutions, including chromic acid, sulfuric acid and oxalic acid, may also be used. Subsequent to the removal of the crystal from the anodizing surface it is thoroughly washed in cold water and dried.

The corrugated surface formed by electropolishing, either with or without the step of further oxidation, is then in condition to serve as a master surface for casting replicas. As noted in FIG. 4 the distance from peak to peak is of the order of 350 Angstroms which means that there are in effect some 730,000 peaks per inch over the treated surface.

Replicas may be made in a number of ways using a number of different materials. Generally, the replica will be formed as either a plastic film or as a carbon film. The plastic film is generally formed by coating the surface with a solution of the plastic material and then removing the solvent. It may also be put on as a hot melt coating. The carbon film is conveniently deposited from carbon vapor.

Figure 5:
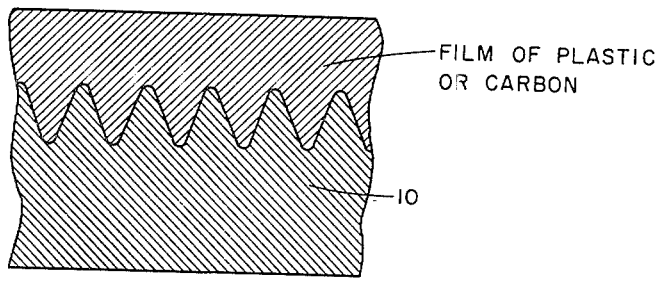
FIG. 5 shows the step in the formation of a replica.

In FIG. 5 it is shown how the plastic film or carbon replica is built up on the corrugated surface. A suitable plastic material for forming a replica is cellulose nitrate. It is preferably applied as an amyl acetate solution having a concentration of from about 1–5%. This solution is merely dropped on the surface with an eye dropper and permitted to harden by evaporating the solvent therefrom. Characteristically such a replica is about .005 inch thick although it may be somewhat thinner or thicker than this. Preferably the film is of such a thickness that it can be easily stripped from the replica and handled. After the solvent has been completely removed and the replica has been hardened it is stripped from the surface. In like manner a replica made from carbon may be formed by exposing the surface to carbon vapors in an evacuated atmosphere for a sufficient length of time to build up the desired thickness of carbon on the surface. As in the case of the plastic film the replica thus formed may be stripped from the surface for further processing.

Figure 6:
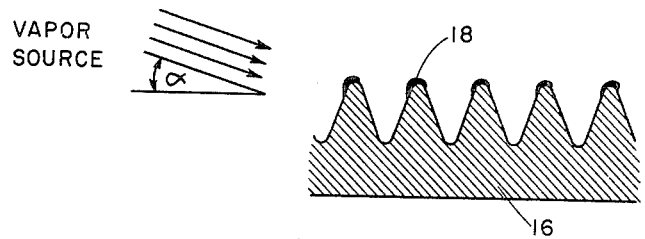
FIG. 6 illustrates the step of shadowing the replica.
Figure 10:
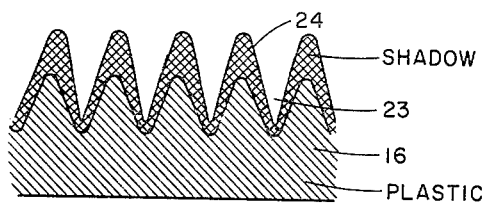
FIG. 10 illustrates how the shadowing may be built up on the replica.

The next step is that of building up fine lines along the peaks of the replica. This is done by shadowing as shown in FIG. 6. The replica 16 is placed in an evacuated device and vapor directed against it to deposit lines 18 on the peaks of the replica. In order that the material forming the lines may be deposited in the form of very thin lines along the peaks it is necessary to use a very small angle in the shadowing. The angle $\alpha$ in FIG. 6 which is that made between the horizontal plane of the peaks and the direction of the metal vapor should be of the order of about 5°. However, angles ranging from about 1–15° may be used, the larger angles being suitable if a grid such as illustrated in FIG. 10 and discussed below is to be made. The ultimate use for which the wire grid is designed will determine the material used to shadow the peaks and form the lines. For example, if the wire grid is to be employed as a polarizer the material used to shadow the surface of the replica may be any metal which is an electrical conductor including aluminum, gold, chromium, copper, silver and the like. However, if it is to be used as a diffraction grating the shadowing material need not be a conductor, or even a metal; for it need only be capable of effecting a change in the optical properties of the radiation incident thereon. Hence, the term "wire" grid is employed in its broadest sense and the lines (or wires) formed by shadowing do not have to be a metal.

Figure 7:
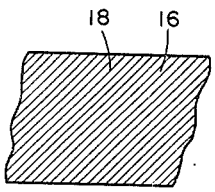
FIG. 7 illustrates the replica produced from the structure of FIG. 6.

FIG. 7 is a top plan view of a fragment of a replica which has been shadowed and shows the parallel metal lines 18 built up on the peaks of the replica surface. FIG. 11 is a photomicrograph of such a shadowed replica suitable for use as a wire grid. Dimensions are marked on FIG. 11 to illustrate the relative fineness and frequency of the lines. The wire grid of FIG. 11 was formed by shadowing a cellulose nitrate replica with platinum at an angle ($\alpha$ of FIG. 6) of 15°. The replica in turn was cast from a (110) aluminum surface formed by electropolishing with a solution of one part by weight perchloric acid in five parts by weight anhydrous methyl alcohol. After thorough washing the resulting corrugated surface was anodized at 5 volts in an aqueous solution of 1% citric acid and 1% ammonium citrate.

Figure 8:
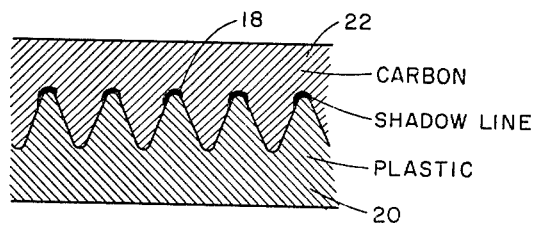
FIGS. 8 and 9 illustrate a variation in the formation of a grating from a replica.
Figure 9:
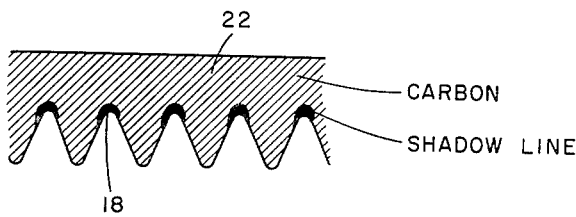

FIGS. 8 and 9 show a modification in the process wherein a replica formed of a plastic film 20 is shadowed to build up the lines 18, e.g., of a metal, and then is subsequently covered with carbon to build up a carbon layer 22. The plastic film forms a support during the operation and then, as illustrated in FIG. 9, it is subsequently removed by dissolving in a suitable solvent to leave the carbon replica with the metal lines 13. Finally, FIG. 10 shows another modification in which shadowing has been carried out to a much greater extent than in FIGS. 6, 8 or 9. In this case the metal which is deposited from the vapor covers the entire replica surface but in such a way that the metal deposited in the valleys 23 is far thinner than that which has been put onto peaks 24. As long as there is a material difference in thickness of the shadowing metal, or other material, at these two points a suitable wire grid may be made. However, for some purposes the configurations of FIG. 6 wherein the valleys are completely uncoated by the metal or other material are preferred.

By the process of this invention it is therefore possible to construct a wire grid grating heretofore not possible to make through prior art techniques. In turn the wire grid grating opens up the possibility of vast new fields of investigations particularly in the ultraviolet region.

It will, thus, be seen that the objects set forth above, among those made apparent from the preceding description, are efficiently attained and since certain changes may be made in carrying out the above method and in the construction set forth without departing from the scope of the invenion it is intended that all matter contained in the above description or shown in the accompanying drawings shall be interpreted as illustrative and not in a limiting sense.

We claim:
1. Method of forming a fine wire grid, comprising the steps of
 (a) electropolishing the surface of an aluminum crysal thereby to form periodic corrugations made up of recurring valleys and peaks on said surface, said surface being defined as any plane resulting from rotating a {110} plane about the crystal axis in a <110> direction up to 36 degrees and in a <100> direction up to 15 degrees;
 (b) forming a thin film replica of said corrugated surface; and
 (c) shadowing the peaks of said film replica to form a gridwork of very fine lines about 350 A. apart.

2. Method of forming a fine wire grid, comprising the steps of
 (a) electropolishing the surface of an aluminum crystal thereby to form periodic corrugations made up of recurring valleys and peaks on said surface, said surface being defined as any plane resulting from rotating a {110} plane about the crystal axis in a <110> direction up to 36 degrees and in a <100> direction up to about 15 degrees;
 (b) oxidizing the resulting corrugated surface to increase the difference between the height of the peaks and valleys;
 (c) forming a thin film replica of said corrugated surface; and
 (d) shadowing the peaks of said film replica to form a gridwork of very fine lines about 350 A. apart.

3. Method in accordance with claim 2 wherein said oxidizing comprises anodizing.

4. Method in accordance with claim 2 wherein said oxidizing comprises heating in air.

5. Method in accordance with claim 2 wherein said shadowing comprises depositing a metal from the vapor phase onto said peaks.

6. Method of forming a fine wire grid, comprising the steps of
 (a) electropolishing the surface of an aluminum crystal thereby to form periodic corrugations made up of recurring valleys and peaks on said surface, said surface being defined as any plane resulting from rotating a {110} plane about the crystal axis in a <110> direction up to 36 degrees and in a <100> direction up to about 15 degrees;
 (b) oxidizing the resulting corrugated surface to increase the difference between the height of said peaks and valleys;
 (c) forming a thin film replica of said corrugated surface;
 (d) stripping said thin film replica from said corrugated surface; and
 (e) depositing metal from the vapor phase in the form of thin strips along the peaks of said replica to form a gridwork of fine metallic lines.

7. Method in accordance with claim 6 wherein said forming a thin film replica comprises depositing a solution of a plastic film material on said corrugated surface and removing the solvent therefrom.

8. Method in accordance with claim 6 wherein forming a thin film replica comprises depositing on said corrugated surface a film of carbon from the vapor phase.

9. Method in accordance with claim 6 wherein said metal is a conductor.

10. Method in accordance with claim 6 wherein said metal is a nonconductor.

11. Method of forming a fine wire grid, comprising the steps of
 (a) electropolishing the surface of an aluminum crystal thereby to form periodic corrugations made up of recurring valleys and peaks on said surface, said surface being defined as any plane resulting from rotating a {110} plane about the crystal axis in a <110> direction up to 36 degrees and in a <100> direction up to about 15 degrees;
 (b) oxidizing the resulting corrugated to increase the difference between the height of the peaks and valleys;
 (c) forming a thin plastic film replica of said corrugated surface;
 (d) shadowing the peaks of said film replica to form a gridwork of very fine lines about 350 A. apart;
 (e) depositing a film of carbon on said replica and over said gridwork; and
 (f) removing said plastic film thereby to form a carbon film having said gridwork.

12. Method of forming a fine wire grid, comprising the steps of
 (a) electropolishing the surface of an aluminum crystal thereby to form periodic corrugations made up of recurring valleys and peaks on said surface, said surface being defined as any plane resulting from rotating a {110} plane about the crystal axis in a <110> direction up to 36 degrees and in a <100> direction up to 15 degrees;
 (b) forming a thin film replica on said corrugated surface; and
 (c) shadowing said thin film replica to deposit thereon a coating, the thickness of which in said valleys differs materially from that on said peaks.

References Cited by the Examiner

UNITED STATES PATENTS

| | | | |
|---|---|---|---|
| 2,232,551 | 2/1941 | Merton | 264—1 |
| 2,313,489 | 3/1943 | Latrobe | 264—1 |
| 2,464,738 | 3/1949 | White et al. | 264—1 |
| 3,045,531 | 7/1962 | Prescott. | |
| 3,045,532 | 7/1962 | Staunton. | |
| 3,046,839 | 7/1962 | Bird et al. | 88—65 |

OTHER REFERENCES

Conn and Bradshaw: "Polarized Light in Metallography," Butterworth's Scientific Publications, 1952, pages 74–75.

ALEXANDER H. BRODMERKEL, *Primary Examiner.*

JEWELL H. PEDERSEN, *Examiner.*

J. K. CORBIN, B. SYNDER, *Assistant Examiners.*